United States Patent [19]

Ljung

[11] 4,282,495
[45] Aug. 4, 1981

[54] HIGH EFFICIENCY CURRENT REGULATOR FOR RING LASER GYROSCOPE

[75] Inventor: Bo H. G. Ljung, Wayne, N.J.

[73] Assignee: The Singer Company, Little Falls, N.J.

[21] Appl. No.: 43,585

[22] Filed: May 29, 1979

[51] Int. Cl.³ .......................................... H01S 3/083
[52] U.S. Cl. ......................... 331/94.5 S; 331/94.5 C; 356/350
[58] Field of Search ..................... 331/94.5 S, 94.5 C, 331/94.5 PE; 315/307, 107; 356/350

[56] References Cited

U.S. PATENT DOCUMENTS 3,928,819  12/1975  Bernstein ..................... 331/94.5 PE

OTHER PUBLICATIONS

"Regulated Power Supply for Laser Tube" by R. A. Maddox, *IBM Tech. Disc. Bull.*, vol. 15, No. 8, (Jan. '73).

Primary Examiner—William L. Sikes
Assistant Examiner—Leon Scott, Jr.
Attorney, Agent, or Firm—James C. Kesterson; Thomas W. Kennedy

[57] ABSTRACT

A method and apparatus for regulating the anode current of a gas lasing system with reduced power dissipation is disclosed. According to this invention a feedback loop is connected between the anode circuitry and the high voltage power supply such that the anode current regulator has a much lower voltage across itself than has been the case in the past. Since the voltage across the current regulator is reduced, there is not nearly as much power for the regulator to dissipate. In addition, because of the smaller power handling requirements, a stabilized anode current can be achieved at about half the level required by prior art circuitry. Thus, the power dissipation can be reduced even further.

2 Claims, 4 Drawing Figures

HIGH EFFICIENCY CURRENT REGULATOR FOR RING LASER GYROSCOPE

BACKGROUND OF THE INVENTION

This invention relates to ring laser gyroscopes in general, and more particularly to a high efficiency current regulator for controlling the high voltage power supply used to sustain the plasma within a ring laser gyroscope.

Because of the complex requirements of todays military and space flight equipment, greater and greater demands are being placed on such equipment as guidance systems. Since gyroscopes represent an essential part of such systems these stringent demands are also required of the gyroscope itself. Therefore, over the years many types of gyroscopes have been developed to meet these increasing demands. One sophisticated modern type gyroscope is referred to as "a ring laser gyroscope." As is inherent in its name, the ring laser gyroscope uses a laser beam which travels in a closed path. Regardless of whether the closed path is triangular, square, octagon, etc., the closed path is commonly referred to as a ring. Such a ring laser gyroscope is used to detect rotation about the axis of the path around which the laser beam travels. Typical ring laser gyroscopes are disclosed in U.S. Pat. Nos. 3,373,650 and 3,467,472. According to the ring laser gyroscopes described in these patents, there is included a triangular block which forms a triangular-shaped ring laser cavity defined by mirrors at the three corners. It will be appreciated that the triangular-shaped block is preferred since it requires a minimum number of mirrors. The laser cavity itself is filled by gas which comprises, for example, helium and/or neon. The laser usually operates at one or two wave lengths; specifically at either 1.15 micrometers in an infrared spectral band or at 0.63 micrometers in a visible wave length region. Through proper choice of the ratios of the two neon isotopes in $Ne^{20}$ and $Ne^{22}$ in the gas mixture, two monochromatic laser beams are created. The two laser beams, respectively, travel in clockwise and counterclockwise directions around the triangle or cavity in the same closed optical path.

With no angular motion about the input axis of the ring laser gyroscope, the length of the two laser beam paths are equal, and the two optical frequencies are the same. Angular movement in either direction about its input axis, however, causes an apparent increase in the cavity length for the beam traveling in the direction of such angular movement and a corresponding decrease for the beam traveling in the opposite direction. Because the closed optical path is a resonant cavity providing substained oscillation, the wave length of each beam must also be increased or decreased accordingly. Angular movement of the ring laser gyroscope in either direction about its input axis, therefore, causes a frequency differential to occur between the two beam frequencies which is proportional to the angular rate.

In accordance with the prior art practice, the two beams are extracted from the laser at its input mirror and they are hetrodyned in a beam combiner to produce an interference pattern. The interference pattern is detected by a photodetector which senses the beam frequency of a hetrodyne optical frequencies of the two beams, and this beam frequency is a measure of the angular rate.

As is understood by those skilled in the art, and as will be further discussed with respect to prior art FIG. 1 hereinafter, the glow discharge in a helium/neon filled ring laser gyroscope is typically accomplished by a split or two path circuit. A common cathode operates in conjunction with two anodes, which anodes must maintain a minimum current or the glow discharge will "drop out." To assure that the necessary current and/or voltage is available at each of these two anodes, it is necessary to provide a voltage source high enough to compensate for voltage changes caused by aging of the ring laser gyroscope, temperature changes, etc. Since in the nominal situation, such a high voltage is not necessary at the anode, the excess voltage must be dropped and otherwise controlled, and the current regulated. It is the reducton of this excess voltage which results in excessive power usage by the ring laser gyroscope. As an example, it has been calculated that in a typical ring laser gyroscope the total dissipated power is approximately 13.5 watts. This wattage which is dissipated as heat has a detrimental effect on the stability of the ring laser gyroscope as it tends to heat up the complete system, and therefore contributes to the time necessary to reach temperature equilibrium after start up. It will be appreciated if the high standby supply voltage can be reduced, the excess power dissipation will also be reduced. Thus, it is an object of this invention to provide a ring laser gyroscope current regulator which can provide a stable anode current without the use of excessively high standby voltages.

It is still another object of the present invention to provide a stable anode current to a ring laser gyroscope without excessive power dissipation.

To accomplish the above mentioned objects as well as other objects which will become evident from the following drawings and detailed description, the present invention provides circuitry for use with a gas lasing system having a cathode and at least one anode. The provided circuitry is for controlling and maintaining the anode current at a selected level. According to this invention, the circuitry comprises a power supply having an adjustable output voltage which is controlled by the level of an input reference voltage. One of the outputs of the power supply is connected to the cathode of the lasing system, and the other is connected to anode current regulating circuitry. The current regulating circuitry which is connected to the anode of the lasing system and the power supply maintains the current through the anode at a preselected level as determined in response to a second input reference voltage. A feedback loop is connected between the current regulating circuitry and provides the power supply reference voltage such that the output voltage of the power supply varies in response to the voltage drop across the current regulating circuitry whereby the voltage is maintained at a low level which low level in turn reduces the power required to be dissipated by said current regulating circuitry.

Accordingly, the above mentioned objects and subsequent description will be more readily understood by reference to the following drawings wherein.

Figure 1:
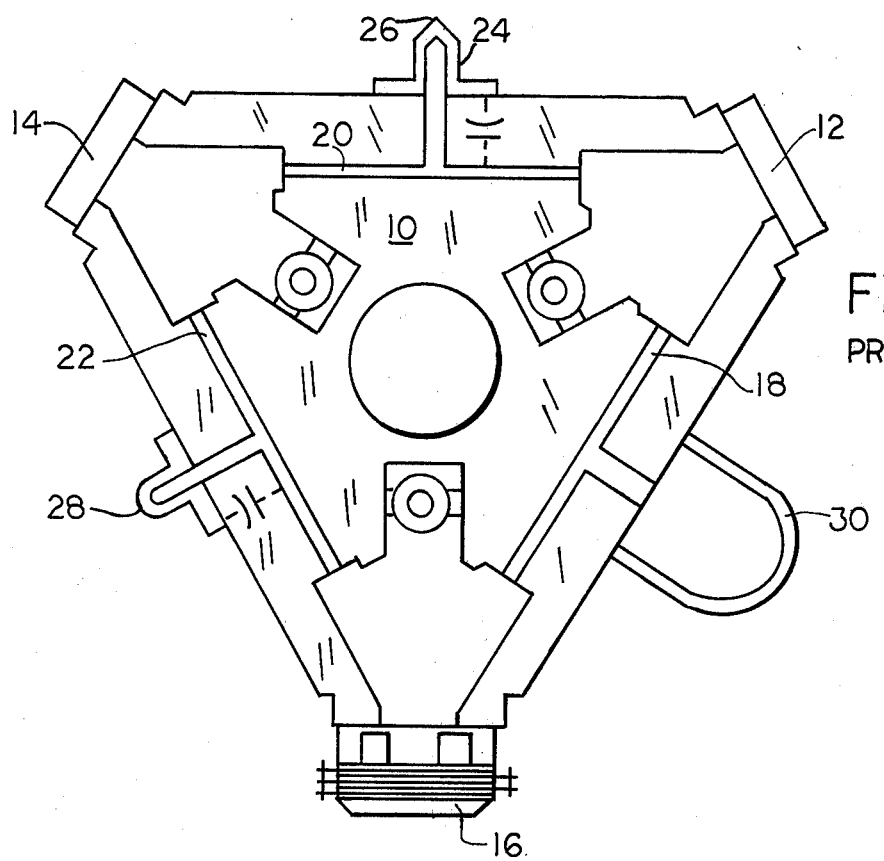
FIG. 1 is a pictorial diagram representative of a prior art gas laser gyroscope showing a split discharge circuit with one cathode and two anodes.

Referring now to FIG. 1 there is shown a pictorial representation of a gas filled ring laser gyroscope. This gyroscope includes a body portion 10 typically made of an ultra-low expansion material such as CERVIT or SCHOTT ZERODUR which materials are made by Owens Illinois Corporation and Schott Optical Glass, Inc. respectively. SCHOTT ZERODUR, for example, has an expansion coefficient of $a = -8 \times 10^{-8}$° C. Located at each apex of the triangular-shaped structure are mirrors 12, 14 and 16 which provide by reflection a path through the cavity, which cavity includes gas capillary tubes 18, 20 and 22. Mirror 16 is of a special type which incorporates piezoelectric actuators which flex the mirror material and thereby allows changes to the total overall path length of the ring laser gyroscope. The selected gas contained in capillary tubes 18, 20 and 22 is introduced into the cavity by means of anode 24 which communicates with capillary tube 20 and has a filled port 26. A second anode 28 similar to that of 24 is located such that it is in communication with path 22. However, anode 28 does not include a fill port. A cathode 30 which communicates with capillary tube 18 is used to complete the electrical circuit discussed hereinafter which creates the glow discharge.

Figure 2:
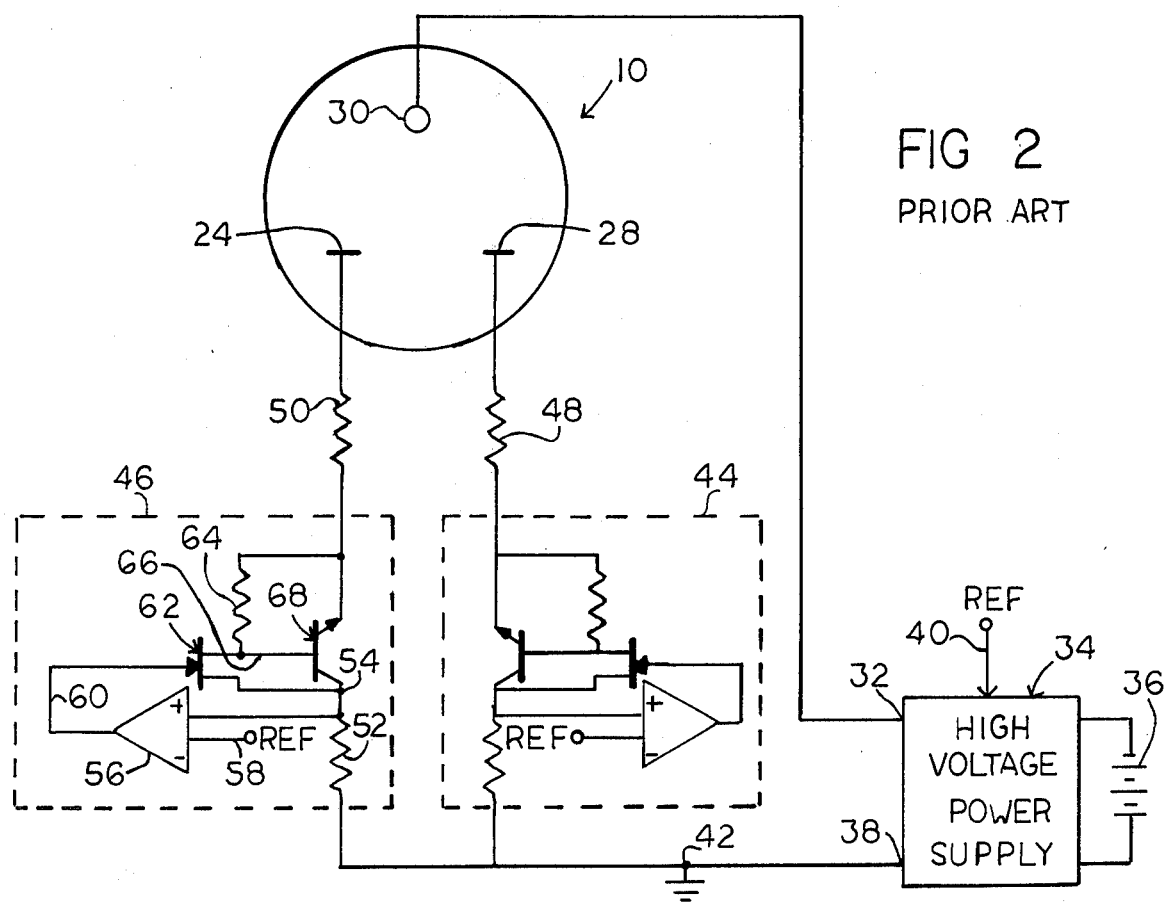
FIG. 2 is a schematic of a prior art circuit used with the ring laser gyroscope of FIG. 1.

Referring now to FIG. 2, there is shown a schematic of prior art circuitry used to provide the necessary voltage and current to create the glow discharge. To aid in understanding the invention and to appreciate the relationship between the ring laser gyroscope pictorially shown in FIG. 1 and the schematic shown in FIG. 2, similar components have like reference numbers. For example, cathode 30 and anodes 24 and 28 are illustrated in both FIG. 1 and FIG. 2.

According to the schematic of FIG. 2, a cathode 30 is connected to one of the output connections or ports 32 of adjustable high voltage power supply 34. Adjustable high voltage power supply 34 is itself powered by a DC power source such as is illustrated by battery 36. The output voltage at port 32 and 38 is selectably adjusted by varying the level of the reference input voltage received at connection 40. The other power supply output connection 38 is grounded at 42 and also connected to current regulating sources 44 and 46. Current regulating sources 44 and 46 in combination with anode resistors 48 and 50, respectively, are used to maintain and stabilize the plasma or glow discharge current of anodes 24 and 28 at selected levels. Since the operation of current regulating source 44 and its respective anode resistor 48 is the same as current regulating source 46 and anode resistor 50, only one of the circuits will be discussed.

The current flow through anode 24 is maintained by sensing the voltage drop across current sampling resistor 52 at point 54 by amplifier 56 which compares the sensed voltage to a reference voltage present at input 58 of amplifier 56. The output of amplifier 56 on the line 60 controls the gate of field-effect transistor 62 which in turn is connected to biasing resistor 64 and the base 66 of series-pass transistor 68. By controlling the base 66 of series-pass transistor 68, the voltage drop across transistor 68 can be controlled. In the typical prior art embodiment, series-pass transistor 68 is a high voltage transistor having the capability of providing a 400 volt drop thereacross. Although the circuit is typically adjusted to provide a nominal 200 volt drop across transistor 68, the extended range or capability up to 400 volts is necessary to allow for substantial changes in the circuit voltage due to temperature changes, aging of components, etc. As will be appreciated by those skilled in the art, such high voltage transistors are typically very slow having a $f_T$ of around 6 mega Hz and provide very small current gain such as for example $h_{FE} = 5$. As will further be appreciated by those skilled in the art, it is this low current gain of the high voltage transistor 68 which results in the need of field-effect transistor 62. It should also be appreciated that because of the low speed of high voltage transistor 68 in combination with field-effect transistor 62, the combination regulator produced by these two components is quite slow, and not always sufficiently fast to compensate for voltage changes in the anode-cathode circuitry. Therefore, to assure the necessary stability, experience has shown that for such prior art ring laser gyroscopes, it is advantageous to maintain the glow discharge current at each anode at about 2 milliamps. Unfortunately, because of the slow response time of the current regulators and the negative resistance resulting from the plasma discharge itself, to assure current stability at a selected 2 milliamps, it is necessary to maintain a large surplus voltage, which in turn means that anode resistors 48 and 50 must be selected with a high resistance, such as, for example, 400 kilohms to prevent oscillations and glow discharge drop-out. Thus, it will be appreciated that the power dissipation required in the current regulating circuitry of the prior art may be very high due to the high voltage power requirements. For example, it is estimated that the total dissipated power of such a prior art circuitry is approximately 13.5 watts. The two anode resistors dissipate approximately 1.6 watts each when they provide a voltage drop of around 800 volts (i.e. 2 milliamps across 400 kilo ohms). In addition to the large wattage dissipation requirement of such an anode resistor, such a large resistor also results in large stray capacitance which further destabilizes the plasma discharge and prevents operation of the circuitry at lower anode currents than otherwise would be possible. In addition, the series-pass transistors also must dissipate a large amount of power such as, for example, on the order of 0.8 of a watt since they may also be required to provide a large voltage drop. Such heat dissipation by a transistor, of course, will require a heat sink which adds still more weight and volume. It will also be appreciated that in addition to the large power dissipation of the prior art circuitry, the larger anode currents than would otherwise be necessary results in increased turn-on transients and shorter life expectancy of the anodes and cathodes of the ring laser gyroscope itself.

Figure 3:
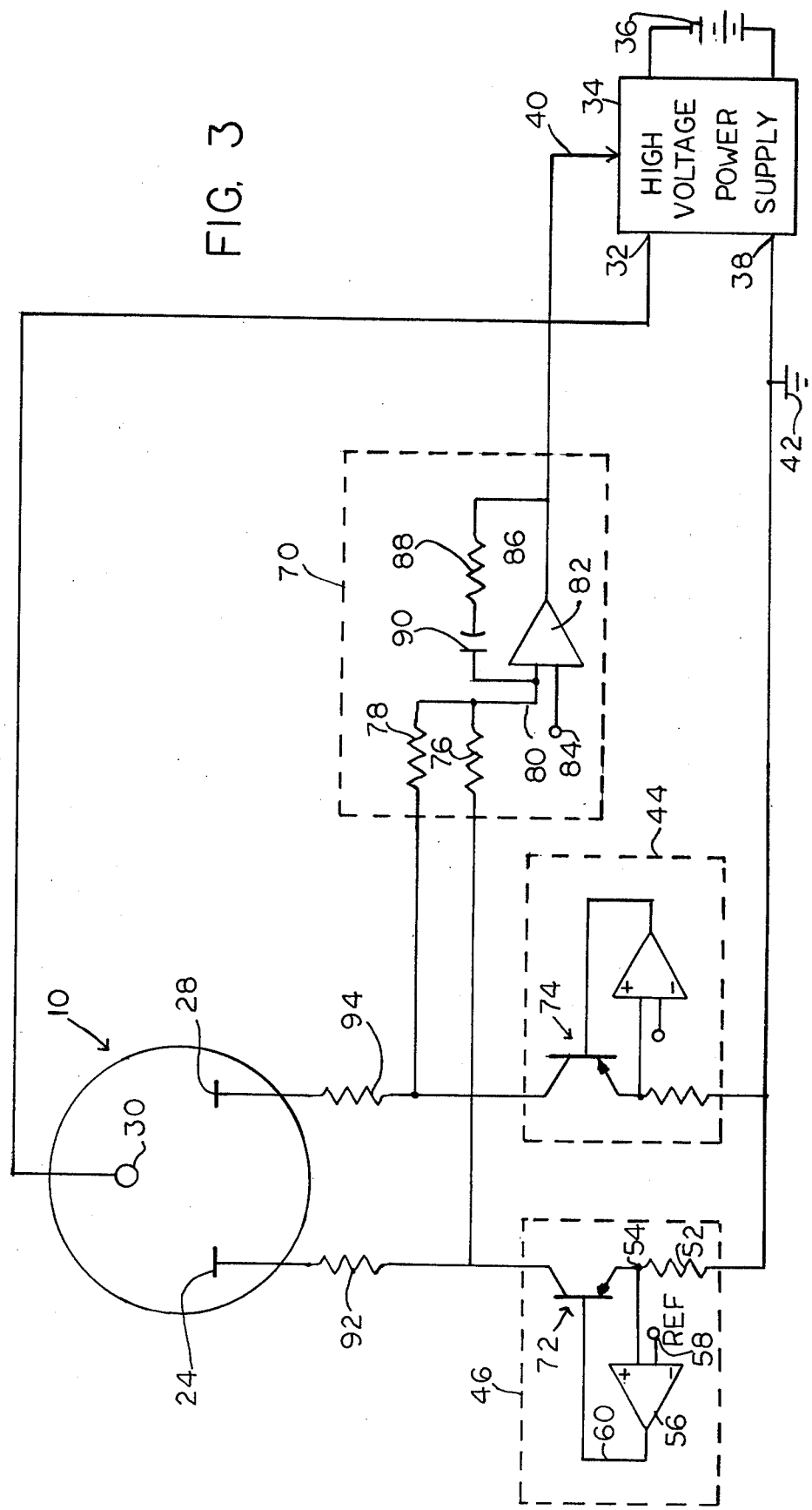
FIG. 3 is a schematic of circuitry incorporating the features of the present invention and suitable for connecting to the ring laser gyroscope of FIG. 1.

Referring now to FIG. 3, there is shown current regulating circuitry for a ring laser gyroscope incorporating the features of this invention.

Elements of the glow discharge circuitry of the present invention which are the same as was used in the prior art are identified by the same reference numbers as used with respect to the discussion of the prior art circuitry of FIG. 2. According to the present invention, a ring laser gyroscope 10 having a cathode 30 and two anodes 24 and 28 is connected to circuitry incorporating the features of this invention for providing the voltage and current necessary to create the glow discharge in the gas filled ring laser gyroscope. As was the case with the prior art circuitry, cathode 30 is connected to output connector or port 32 of high voltage power supply 34 which in turn receives its power from power source 36. The other output connector or port 38 is connected to ground 42 and to current regulating sources 44 and 46 as was the case of the prior art. However, according to the present invention, feedback circuitry 70 has been added between the two anode circuits and the reference voltage input 40 of power supply 34 such that the output voltage between ports 32 and 38 of power supply 34 varies in response to changes in the anode currents. Feedback circuitry 70 samples the collector voltage of series-pass transistors 72 and 74 of current regulating sources 46 and 44 by means of high-resistance resistors 76 and 78, respectively. These voltages are summed at input 80 of operation amplifier 82 and compared to the reference input voltage received at input 84 such that the output 86 of operational amplifier 82 varies according to the input at 80. Resistor 88 and capacitor 90 comprise the operational amplifier feedback loop and are selected according to standard practices as necessary to provide the required transfer function across operational amplifier 82. According to the embodiment of the invention illustrated in FIG. 3, when the system is first turned on (that is, when high voltage power supply 34 first provides a potential across cathode 30 to anodes 24 and 28), feedback circuitry 70 will adjust the output of high voltage power source 34 to a high level since at such initial turn-on there will be substantially no current flow from either anode, and consequently the voltage at the collectors of transistors 72 and 74 will be substantially at ground level. Thus, the output voltage provided by power supply 34 between ports 32 and 38 will increase until automatic turn on of the ring laser gyroscope is achieved. After the glow discharge or plasma turn on, anode current flow will occur which will result in feedback circuitry 70 sensing change in the voltage at the collectors or transistors 72 and 74 which in turn will decrease the output voltage of power supply 34 to a selected level as determined by the reference voltage applied to input 84 of operation amplifier 82. In one preferred embodiment, the reference voltage applied at 84 is adjusted so that equilibrium is achieved when the collector voltage of series-pass transistors 72 and 74 is approximately −30 volts. Series-pass transistors 72 and 74 are selected, for example, with an operational range of between about −60 and −2 volts. Thus, it can be seen that at −30 volts the transistors are operating midway in their operating range. Recalling the series-pass transistors of the prior art circuits described with respect to FIG. 2, it is seen that by the use of feedback circuitry 70 to control the output voltage of power supply 34, transistors with much less working voltage may be used. Consequently, transistors which respond to fluctuations of much higher frequencies ($f_T$=300 mhz) and have significantly higher current gain ($h_{fe}$=300) are available.

Thus, it can be seen that the addition of the servo loop between the anode and the high-voltage power supply 34 provides means for continuously and automatically adjusting the output of the power supply 34 such that the collector-emitter voltage series-pass transistors 72 and 74 can be maintained substantially constant and small compared to the series-pass transistor used in the prior art current regulator.

Figure 4:
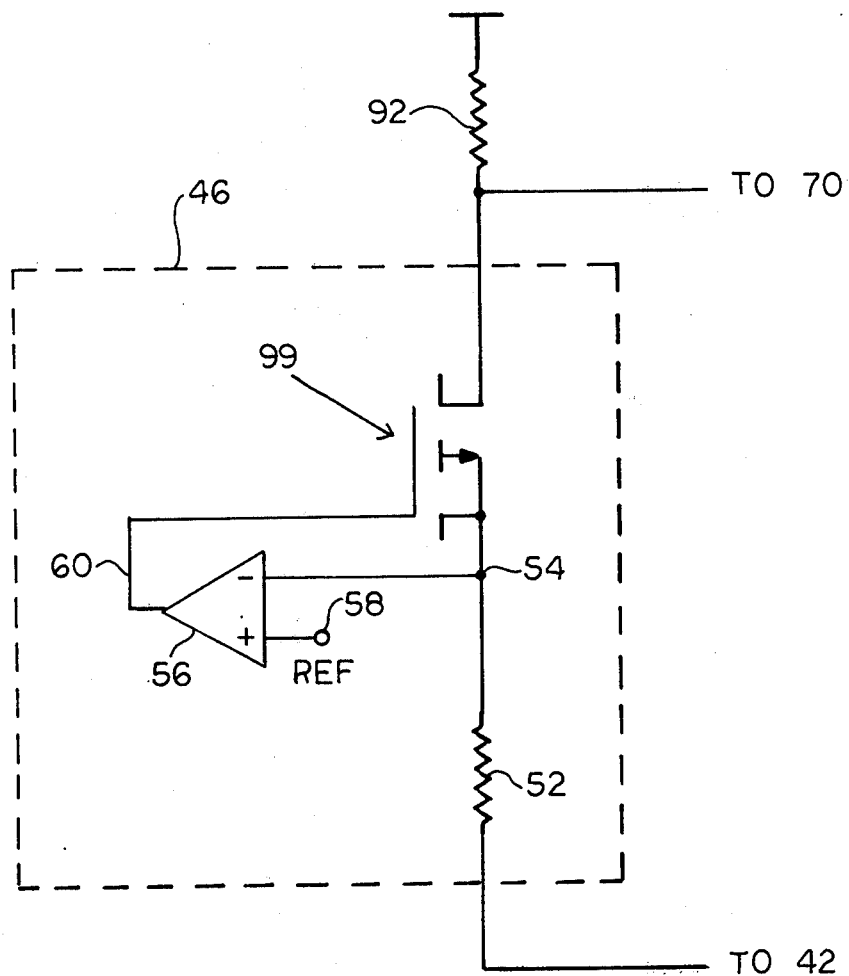
FIG. 4 is a schematic of circuitry of the preferred embodiment.

In addition, because of the high current gain ($h_{FE}$) available in transistors suitable for use with the present invention, it is possible to eliminate the field effect transistors. Furthermore, because the variation in the base drive current between the two series-pass transistors due to aging, etc., will be small and substantially equal they may also be ignored. A preferred embodiment is shown in FIG. 4. In this embodiment, the transistors used in the current regulator 46 is of the type P-channel enhancement made metal oxide insulated field effect transistor (FET), 99. By the use of suitable FET's the base drive current variation with temperature, that is a problem with bipolar transistors, can be eliminated. Because of the fast action of the current regulators a considerable increase in dynamic impedance of the regulator is achieved and, therefore, anode resistors 92 and 94 may be chosen to have significantly small resistance than the similar anode resistor of the prior art. For example, anode resistors of 100 kilohms are quite suitable for use with the present invention whereas it will be recalled anode resistors of the prior art where on the range of 400 kilohms. Thus, because of the combined effect of the lower power dissipation of the current source regulators themselves, (i.e. the series-pass transistors 72 and 74, and the anode resistors 92 and 94), the much faster response of the series-pass transistors the total power dissipation of the remainder of the system, the smaller physical size, and the lower stray capacitance of the anode resistor, a ring laser gyroscope with a lower anode current operation is practical. Thus, according to the present invention it has been found that anode currents of one milliamp are quite satisfactory rather than the necessary 2 milliamps used in the prior art. Thus, the total power dissipation is reduced even further, such that the total power dissipation according to the present invention is about 5.3 watts whereas the circuits of the prior art dissipated about 13.5 watts.

Although the unique circuitry of this invention for use with ring laser gyroscopes has been described with respect to a specific embodiment, it is not intended that such specific reference be considered limitations upon the scope of the invention except insofar as is set forth in the following claims.

What is claimed is:

1. Control circuitry for a gas lasing system for a ring laser gyro having a cathode and having first and second anodes for providing the plasma or glow discharge, said control circuitry being adapted for controlling and maintaining the current of each said anode at a selected level and for reducing the power required to be dissipated by said circuitry comprising:

a power supply having first and second output means for providing an output voltage which voltage varies in response to a variable input reference voltage applied to a reference input port of said power supply, said first output means being connected to said lasing system cathode;

first and second current regulating circuits connected between said first and second lasing system anodes respectively and said second output means of said power supply, each said current regulating circuit being arranged for maintaining the current through its said anode at a selected level in response to an input reference voltage which reference voltage itself in turn varies in response to the anode current level; and a feedback loop connected between said first and second current regulating circuits and said power supply variable reference voltage input port for varying the output voltage of said power supply second output means in response to the voltage drop across said first and second regulating circuits whereby the voltage across said first and second current regulating circuits is maintained at a selected level, wherein said first and second current regulating circuits each comprises an anode resistor having one end connected to its said anode, a transistor connected between the other end of said anode resistor and second output means, and a controlling means, said controlling means being connected to said transistor such that said transistor controls said anode current in response to a control voltage received by said controlling means, and wherein said feedback loop includes an operational amplifier having a first input which is connected to said other end of each said anode resistor for sensing the voltage level across said first and second current regulating circuits, and wherein said feedback loop includes a reference input means for providing a selected reference voltage, said operational amplifier being connected to said reference input means for providing a variable output which varies in response to changes in said voltage across said first and second current regulating circuits when compared to said selected reference voltage.

2. The circuitry of claim 1 wherein each said anode resistor is a field effect transistor, and wherein said operational amplifier has a feedback loop having a resistor and a capacitor disposed between its first input and its output.

* * * * *